United States Patent [19]

Held-Elbert et al.

[11] Patent Number: 4,839,920
[45] Date of Patent: Jun. 13, 1989

[54] METHOD FOR DETERMINING TELEPHONE DIAL PULSE PARAMETERS INDEPENDENTLY OF SUBSCRIBER LINE LENGTH

[75] Inventors: Gabriele Held-Elbert, Lochhofen; Wolfgang Kaiser; Wilhelm Koch, both of Munich; Werner Schmutzler, Fuerstenfeldbruck, all of Fed. Rep. of Germany

[73] Assignee: Siemens Aktiengesellschaft, Berlin and Munich, Fed. Rep. of Germany

[21] Appl. No.: 900,039

[22] Filed: Aug. 25, 1986

[30] Foreign Application Priority Data

Sep. 30, 1985 [DE] Fed. Rep. of Germany ....... 3534829

[51] Int. Cl.$^4$ ............................................. H04Q 1/36
[52] U.S. Cl. .................................... 379/377; 379/286; 379/342
[58] Field of Search ............... 379/286, 280, 258, 268, 379/353, 341, 342, 377, 378, 379, 350, 372, 339, 1; 375/4; 178/70 TS, 70 R

[56] References Cited

U.S. PATENT DOCUMENTS

| | | | |
|---|---|---|---|
| 3,456,083 | 7/1969 | Van der Veen | 379/377 X |
| 3,879,583 | 4/1975 | Rooks | 379/342 |
| 3,935,392 | 1/1976 | Smith et al. | 379/286 X |
| 4,071,781 | 1/1978 | Kayalioglu | 379/342 X |
| 4,300,024 | 11/1981 | Wever et al. | 379/1 |

FOREIGN PATENT DOCUMENTS

| | | | |
|---|---|---|---|
| 0133806 | 10/1979 | Japan | 379/342 |
| 0122579 | 9/1981 | Japan | 379/342 |
| 0207496 | 12/1982 | Japan | 379/377 |

OTHER PUBLICATIONS

"Dial Pulse Detector", C. R. Bringol et al., IBM Technical Disclosure, vol. 18, No. 4, Sept. 1975, pp. 991–992.
Translation Japanese Pat. No. 56 [1981]—122579.

Primary Examiner—Jin F. Ng
Assistant Examiner—Randall S. Vaas
Attorney, Agent, or Firm—Adel A. Ahmed

[57] ABSTRACT

A method is disclosed for measuring telephone dial pulse parameters independent of telephone subscriber line length. To avoid distortions resulting from varying subscriber line lengths, there is performed during the first pulse interval of a dial pulse series to be measured, a voltage measurement with results in a value that depends on the line length, and, in accordance with this value, the times measured for pulse interval and pulse duration of the dial pulse series are corrected.

6 Claims, 1 Drawing Sheet

METHOD FOR DETERMINING TELEPHONE DIAL PULSE PARAMETERS INDEPENDENTLY OF SUBSCRIBER LINE LENGTH

BACKGROUND OF THE INVENTION

1. Technical Field

The invention relates to the field of telephone dial pulse parameter testing, and especially to a method for determining independent of the subscriber line length—the time parameters of dial pulses.

2. Description of the Prior Art

The determination of time parameters of dial pulses is of importance for instance in the noise suppression of a subscriber connection. The pulse duration/pulsing interval ratio of telephone dial pulses is measured and evaluated according to the relationship $$\text{ratio} = \frac{\text{quiet interval duration}}{\text{quiet interval duration} + \text{pulse duration}} \times 100\%$$

sometimes referred to as percent break.

The time values measured for this purpose in the subscriber circuit at the telephone central office for the pulse duration and interval duration of dial pulses are dependent on the length of the telephone subscriber's line, so that values derived according to prior art techniques do not give exact information about the actual conditions in the dial pulsing switch in the subscriber terminal. As the line lengths differ from subscriber connection to subscriber connection, this influence cannot be taken into account in a lump sum.

It is therefore the object of the invention to indicate a method for determining the time parameters of dial pulses where the influence of the line length of a telephone subscriber's line is excluded.

SUMMARY OF THE INVENTION

According to the invention, this problem is solved in that during the first pulse interval of a dial pulse series a voltage produced by the supply voltage source on the subscriber line is measured, and that according to the voltage amplitude thus determined, which depends on the line length of the subscriber line, the times measured for the pulse duration and pulse interval of the dial pulse series are corrected.

To exclude influences of variances in the supply voltage during the correction process, a further step of the method according to the invention provides that during the first dial pulse of a dial pulse series, caused by a loop interruption, a measurement of the supply voltage is made and the deviation of the resulting value from a mean value is made use of for the correction of the voltage value determined in the first pulse interval of the dial pulse series.

According to a first exemplary method, the measuring point for said voltage measurements may be, for the measurement during the pulse interval, the b-wire and, for a measurement during the dial pulse thereof, the a-wire of the telephone subscriber line. According to a second exemplary method, the voltage between the a-wire and the b-wire is measured both during the first dial pulse and during the first pulse interval.

In the following detailed description, the invention will be explained more specifically by way of an exemplary embodiment with reference to a drawing comprising two figures.

DETAILED DESCRIPTION

Figure 2:
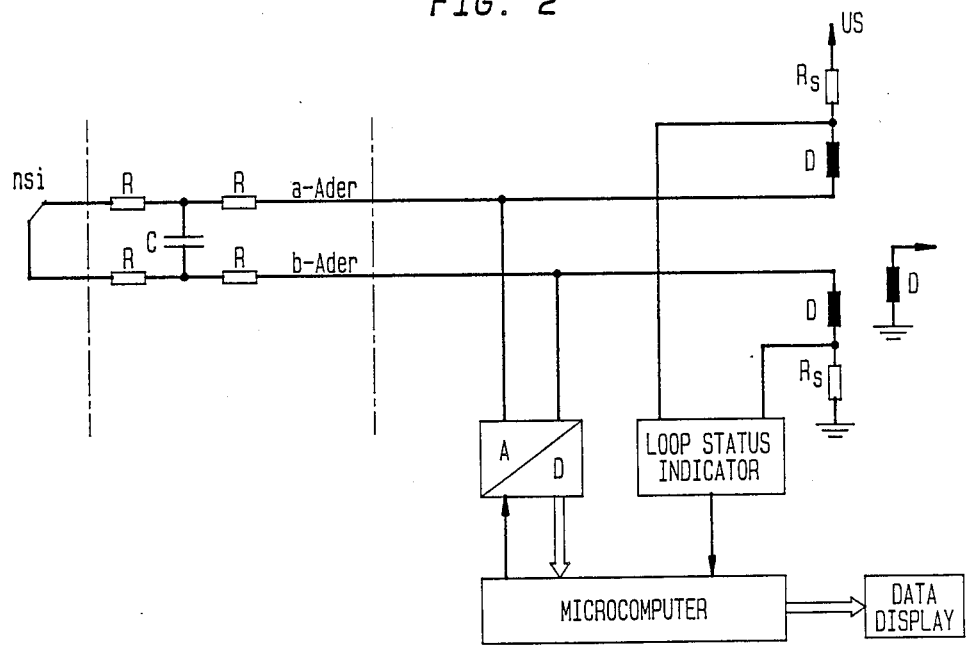
FIG. 2 discloses a circuit arrangement for carrying out the method according to the invention together with a subscriber line and a terminal connected thereto, as well as a part of the subscriber line circuit at a telephone central office.

In FIG. 2 a subscriber line TL with the wires a and b is symbolized by line resistances R and a line capacitance C.

Of the terminal connected to the subscriber line, only the contact nsi of the dial pulsing switch is shown, by means of which the subscriber loop is interrupted and closed during dialing.

Of the subscriber line circuit at the telephone central office for this subscriber line, only the supply resistors $R_S$ are shown, which are contained in the circuit of a supply battery, as well as the windings D of the voice transformer.

To carry out the method of the invention, that is, to determine the time parameters of the dial pulses in the manner according to the invention, the actual circuit arrangement consists firstly of a loop status indicator J. By means of the loop status indicator, the make-break status of the loop is determined. During the operation state of the dialing, the loop status indicator furnishes information as to whether a loop connection or a loop interruption exists.

Secondly, it comprises an analog to digital converter A/D which is connected to the wires a and b of the subscriber line and which transforms an analog voltage measured between the wires of the subscriber line into a digital value. The arrangement thus serves for the aforementioned method variant where in the dial pulse interval as well as during a dial pulse the voltage between the line wires is evaluated.

The circuit arrangement according to FIG. 2 further comprises a microcomputer MC, to which are supplied the output signals of the analog to digital converter as well as those of the loop status indicator. The microcomputer MC may control a data display MA.

Figure 1:
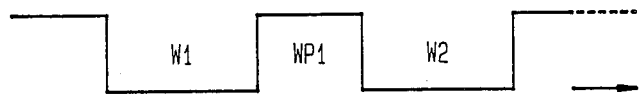
FIG. 1 shows a pulsing time diagram for a dial pulsing telephone.

FIG. 1 shows the time ratios of loop closure and loop interruption during a part of the operational state of dialing. Starting from a state in which the subscriber loop is closed, the first dial pulse, see time span W1, of a dial pulse series is caused by a loop interruption.

According to the invention, during this first dial pulse the voltage between wires a and b of the subscriber loop, that is, the supply voltage, is measured. In the microcomputer MC, the relation of the thus determined voltage value to a mean value of the supply voltage is processed to within a correction factor.

During the following first dial pulse interval, see time span WP1 in FIG. 1, in which the subscriber loop is closed again, a voltage measurement between the a-wire and the b-wire takes place again, since during this interval the voice circuit in the subscriber terminal is bridged at low impedance, the voltage value found represents a measure of the line length of the subscriber line and in relation to the value of the supply voltage delivered by the battery, modified by the first-named correction factor, resulting in a correction factor by which the pulse duration and pulse interval, measured by the loop status indicator, of the first and of the following pulses of the dial pulse series are corrected by means of the microcomputer MC. The data display MA thus may indicate values independent of the length of the subscriber line.

As has been indicated, instead of a voltage measurement between the a and b wires of the subscriber line, there can be measured during the first dial pulse, the voltage prevailing between the a-wire and a point in the circuit carrying ground potential. This voltage may be then used for the formation of a correction factor for the value of the supply voltage., For the correction of the pulse time and interval time, the voltage prevailing during the following dial interval between the b-wire and the circuit point carrying ground potential can be used.

Thus, three methods for obtaining a line length correction signal are disclosed from the application of which, accurate time parameters may be obtained. These methods should only be deemed to be limited in scope by the claims which follow.

What is claimed is:

1. A method for determining telephone dial pulse parameters independently of the length of a subscriber line of a telecommunication system, the dial pulses being produced by loop interruptions caused by a dial pulsing switch of a subscriber terminal connected via the subscriber line, characterized in that, during a first pulse interval (WP1) of a dial pulse series, a voltage produced by a supply voltage source on the subscriber line (TL) is measured, and that according to the voltage amplitude thus measured, which depends on the line length of the subscriber line, times determined by measurement of the pulse duration (W1, W2 . . . ) and pulse interval (WP1 . . . ) of a dial pulse series are corrected.

2. A method according to claim 1, further characterized in that, during the first dial pulse (W1) of the dial pulse series produced by a first loop interruption, a measurement of the supply voltage is made, and that the deviation thereof from a mean value is used for correcting a voltage value determined in the first pulse interval (WP1) of the dial pulse series.

3. A method according to claim 1, further characterized in that the voltage measurement occurs during the first pulse interval of the dial pulse series at the b-wire (b) of the subscriber line (TL).

4. A method according to claim 2, further characterized in that the voltage measurement occurs during the first dial pulse (W1) at the a-wire (a) of the subscriber line (TL).

5. A method according to claim 1, further characterized in that the voltage measurement occurs in the first pulse interval (WP1) of the dial pulse series between the a- and b-wires (a, b) of the subscriber line (TL).

6. A method according to claim 2, further characterized in that the voltage measurement occurs during the first dial pulse (W1) of the dial pulse series between the a-wire and the b-wire (a, b) of the subscriber line.

* * * * *